United States Patent
Chi et al.

(10) Patent No.: US 10,745,212 B2
(45) Date of Patent: Aug. 18, 2020

(54) AUXILIARY CONVEYOR AND CORRESPONDING CONVEYING SYSTEM

(71) Applicant: ABB Schweiz AG, Baden (CH)

(72) Inventors: Zhaofu Chi, Shanghai (CN); Hao Gu, Shanghai (CN); Jibo Yang, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/166,886

(22) Filed: Oct. 22, 2018

(65) Prior Publication Data
US 2019/0055093 A1    Feb. 21, 2019

Related U.S. Application Data

(63) Continuation of application No. PCT/CN2017/074788, filed on Feb. 24, 2017.

(51) Int. Cl.
*B65G 35/06* (2006.01)
*B65G 47/57* (2006.01)
(Continued)

(52) U.S. Cl.
CPC .......... *B65G 47/643* (2013.01); *B65G 35/06* (2013.01); *B65G 37/005* (2013.01);
(Continued)

(58) Field of Classification Search
CPC ........ B65G 35/06; B65G 54/02; B65G 54/04; B65G 47/5145; B65G 1/127; B65G 1/133;
(Continued)

(56) References Cited

U.S. PATENT DOCUMENTS 4,515,264 A * 5/1985 Sticht .................. B65G 37/02
                                                    198/345.3
4,671,402 A * 6/1987 Inoue .................. B65G 35/06
                                                    198/465.3
(Continued)

FOREIGN PATENT DOCUMENTS

CN    101139045 A    3/2008
CN    101436561 A    5/2009
(Continued)

OTHER PUBLICATIONS

Intellectual Property Office of the P.R. China, International Search Report & Written Opinion issued in corresponding Application No. PCT/CN2017/074788, dated Jun. 15, 2017, 9 pp.
(Continued)

*Primary Examiner* — James R Bidwell
(74) *Attorney, Agent, or Firm* — Taft Stettinius & Hollister LLP; J. Bruce Schelkopf

(57) ABSTRACT

An auxiliary conveyor, which is connected with a main conveyor including at least two conveying paths, the auxiliary conveyor including a conveying part configured to receive a load from one of the at least two conveying paths and convey the load through the other of the at least two conveying paths; and a driving part connected with the conveying part and configured to drive the conveying part to move from one of the at least two conveying paths to the other of the at least two conveying paths.

18 Claims, 3 Drawing Sheets

(51) Int. Cl.
*B65G 47/248* (2006.01)
*B65G 47/64* (2006.01)
*B65G 37/00* (2006.01)

(52) U.S. Cl.
CPC ........... *B65G 47/248* (2013.01); *B65G 47/57* (2013.01); *B65G 2207/14* (2013.01)

(58) Field of Classification Search
CPC .. B65G 2207/14; B65G 47/57; B65G 47/248; B65G 47/643; B65G 37/005; B23Q 7/1442; B23Q 7/1447; B23Q 7/1463
USPC ............................ 198/580, 465.1, 465.2, 805
See application file for complete search history.

(56) References Cited

U.S. PATENT DOCUMENTS

| | | | | |
|---|---|---|---|---|
| 5,090,555 A | * | 2/1992 | Kura | B65G 35/06 198/465.1 |
| 5,201,403 A | * | 4/1993 | Haas, Sr. | A21C 15/02 198/347.1 |
| 5,465,827 A | * | 11/1995 | Nakagawa | B65G 35/06 104/168 |
| 5,577,597 A | * | 11/1996 | Kakida | B65G 37/02 198/465.1 |
| 6,267,058 B1 | | 7/2001 | Schlienger | |
| 6,814,221 B2 | * | 11/2004 | Goussev | B65G 35/08 198/435 |
| 8,528,717 B2 | * | 9/2013 | Ando | B41F 17/005 198/306 |
| 8,997,969 B2 | * | 4/2015 | Plakolm | B23Q 7/005 198/346.2 |
| 2018/0208414 A1 | | 7/2018 | Gu et al. | |
| 2019/0283974 A1 | * | 9/2019 | Gu | B65G 35/06 |

FOREIGN PATENT DOCUMENTS

| | | |
|---|---|---|
| CN | 201873321 U | 6/2011 |
| CN | 103625907 A | 3/2014 |
| CN | 104833814 A | 8/2015 |
| CN | 105151803 A | 12/2015 |
| CN | 105692104 A | 6/2016 |
| CN | 205574965 U | 9/2016 |
| CN | 205916627 U | 2/2017 |
| JP | H2-18420 U | 2/1990 |
| JP | 2000-097312 A | 4/2000 |
| JP | 2006151524 A | 6/2006 |
| JP | 2008-290812 A | 12/2008 |
| JP | 2009-249063 A | 10/2009 |

OTHER PUBLICATIONS

Chinese Patent Office, Search Report issued in corresponding Chinese application No. 2017800205677, dated Dec. 12, 2019, 6 pp.
Chinese Patent Office, First Office Action issued in corresponding Chinese application No. 2017800205677, dated Dec. 20, 2019, 16 pp.
Japanese Patent Office, First Office Action issued in corresponding Japanese application No. 2019-503608, dated Oct. 8, 2019, 8 pp.
Chinese Patent Office, Search Report issued in corresponding Chinese application No. 2017800205677, dated May 26, 2020, 4 pp.
Chinese Patent Office, Second Office Action issued in corresponding Chinese application No. 2017800205677, dated May 26, 2020, 15 pp.

* cited by examiner

AUXILIARY CONVEYOR AND CORRESPONDING CONVEYING SYSTEM

FIELD OF INVENTION

The present disclosure relates to the technical field of conveyance, and more specifically, to an auxiliary conveyor and corresponding conveying system.

BACKGROUND OF INVENTION

In some industrial production lines, the production process of products needs to proceed in a dust-free environment. This requires conveyors in production lines not to produce any tiny particle while conveying objects.

Patent CN105151803A discloses a conveyor for use in a dust-free environment, the conveyor comprising a magnetic gear and a magnetic rack which are not in contact with each other. When the magnetic gear rotates, since there exists a magnetic force between the magnetic gear and the magnetic rack, the magnetic rack will be driven to move in a certain direction, and accordingly a conveying truck with the magnetic gear mounted thereon is driven to move in the direction. Therefore, objects placed on the conveying truck can be conveyed to required positions.

Nevertheless, the conveyor in the prior art, when forming a loop for use, has to to occupy a larger ground area. Moreover, objects cannot be rotated during conveyance, and thus production and processing needs cannot be satisfied.

SUMMARY OF INVENTION

It is an objective of the present disclosure to provide an auxiliary conveyor and corresponding conveying system.

One embodiment of the present disclosure provides an auxiliary conveyor, connected with a main conveyor which comprises at least two conveying paths, the auxiliary conveyor comprising: a conveying part, configured to receive a load from one of at least two conveying paths and convey the load through the other of the at least two conveying paths; and a driving part, connected with the conveying part and configured to drive the conveying part to move from one of the at least two conveying paths to the other of the at least two conveying paths.

Another embodiment of the present disclosure provides a conveying system, comprising: a main conveyor, comprising at least two conveying paths; at least one additional auxiliary conveyor according to the present disclosure, connected with an end of the main conveyor; and a load, which is a conveying truck configured to carry a to-be-carried object.

With the auxiliary conveyor and corresponding conveying system as provided by the present disclosure, when paths through which the object is conveyed form a loop, the ground area can be saved, so as to facilitate reuse of the conveying truck. In addition, with the conveyor and corresponding conveying system as provided by the present disclosure, the object can be rotated during conveyance, so as to facilitate production and processing.

BRIEF DESCRIPTION OF THE DRAWINGS

The present invention may be better understood by description of embodiments of the present invention, with reference to the accompanying drawings, wherein.

Throughout the figures, same or similar reference numbers indicate same or similar elements.

DETAILED DESCRIPTION OF EMBODIMENTS

Figure 1:
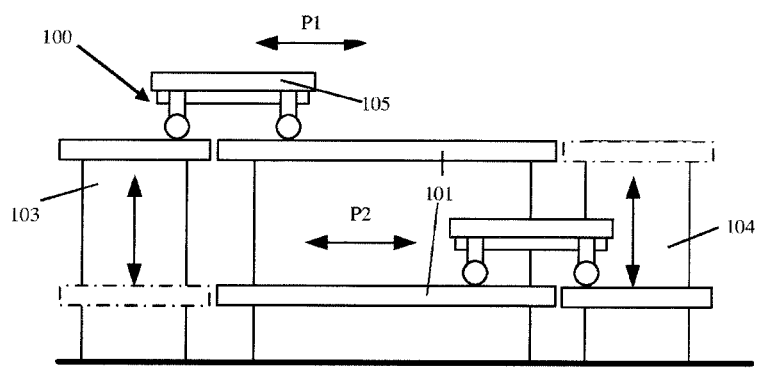
FIG. 1 schematically shows a front view of a conveying system according to one embodiment of the present disclosure.

Description is presented below to specific embodiments of the present invention. It should be noted while describing the embodiments, this specification might not thoroughly describe all features of actual embodiments for the sake of brevity. It should be understood during actual implementation of any one embodiment, just as in the course of any one engineering project or design project, in order to achieve specific objectives of developers and satisfy system-related or business-related restrictions, usually a variety of concrete policies will be made, which also leads to changes from one embodiment to another embodiment. In addition, it may be understood though efforts made during such development might be complicated and tedious, to those of ordinary skills in the art related to content disclosed by the present invention, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present invention clearer, the technical solution of the present invention will be clearly and completely described with reference to the specific embodiments and the accompanying drawings of the present invention. Obviously, the embodiments to be described are merely part of embodiments of the present invention, rather than all embodiments. Based on the embodiments of the present invention, all other embodiments as made by those of ordinary skills in the art without the exercise of any inventive skill should fall in the protection scope of the present invention.

The conveying system disclosed by the present disclosure may be used for transporting and delivering objects and the like during production.

According to one embodiment of the present disclosure, as shown in FIGS. 1 to 4, a conveying system 100 may comprise a main conveyor 101, at least one auxiliary conveyor 103 and a load. The main conveyor 101 may comprise at least two conveying paths P1 and P2. The auxiliary conveyor 103 may be connected with an end of the main conveyor 101.

In the present disclosure, the load comprises a conveying truck 105 and an object (if any) thereon.

According to one embodiment of the present disclosure, as shown in FIG. 1, the conveying paths P1 and P2 may be at different heights off the ground. According to another embodiment of the present disclosure, as shown in FIG. 4, at least two conveying paths P3 and P4 of the main conveyor 101 may be at roughly equal heights off the ground.

According to one embodiment of the present disclosure, as shown in FIG. 1, the conveying paths P1 and P2 may be roughly parallel. Moreover, when P1 and P2 are roughly parallel a plane formed by P1 and P2 may be roughly perpendicular to the ground (as shown in FIG. 1) or be at an angle to the ground.

Figure 4:
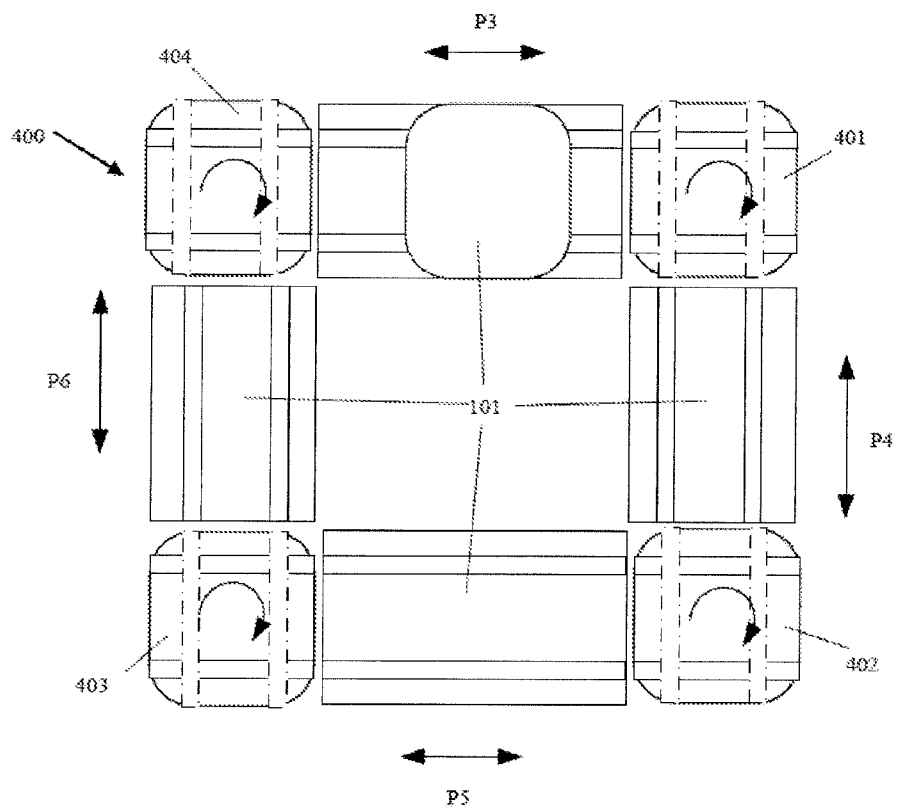
FIG. 4 schematically shows a top view of a conveying system according to another embodiment of the present disclosure.

According to another embodiment of the present invention, as shown in FIG. 4, the at least two conveying paths P3 and P4 of the main conveyor 101 may be in the same plane and not parallel to each other, for example, may be roughly perpendicular to each other.

Of course, the at least two conveying paths of the main conveyor may further not be located in the same plane.

Though only part of the above circumstances will be described below and illustrated in the accompanying drawings, those skilled in the art should appreciate the technical solution of the present disclosure is completely applicable to other circumstances mentioned above.

Figure 2:
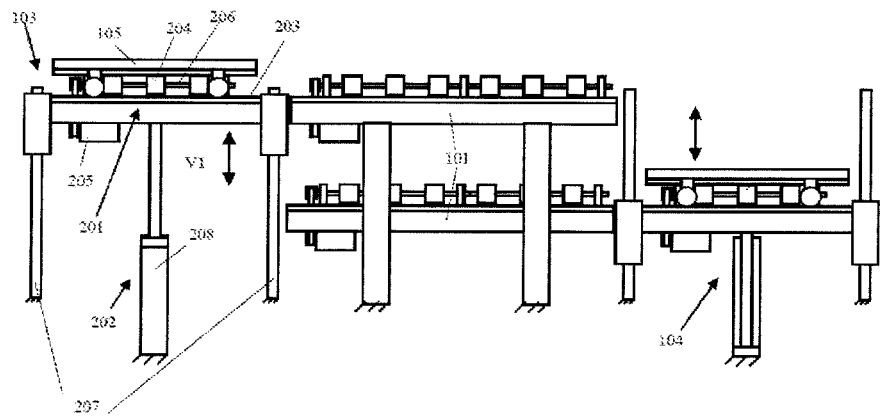
FIG. 2 schematically shows a front view that an auxiliary conveyor in the conveying system shown in FIG. 1 conveys a load between multiple conveying paths of a main conveyor.
Figure 3:
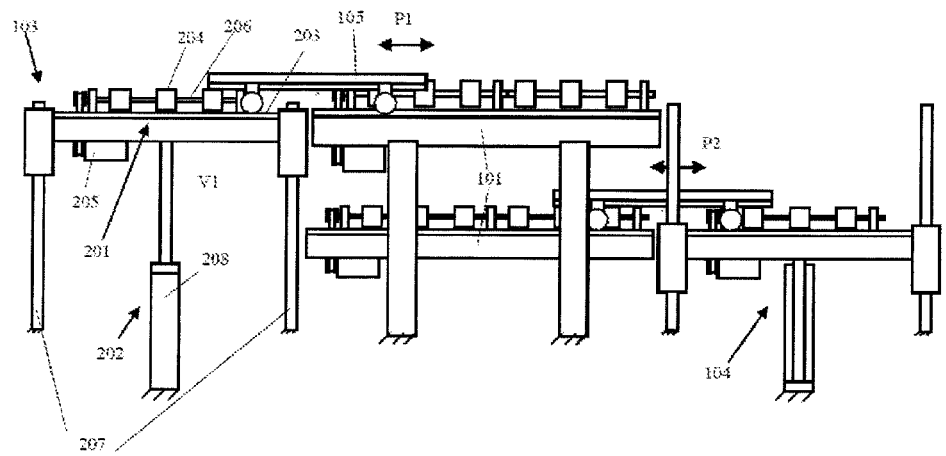
FIG. 3 schematically shows a front view that an auxiliary conveyor in the conveying system shown in FIG. 1 conveys a load along a conveying path of a main conveyor.

With reference to FIG. 1 in conjunction with FIGS. 2 and 3, in the conveying system 100, the main conveyor may have two conveying paths P1 and P2 at different heights off the ground, the two conveying paths are roughly parallel and a plane formed by them is roughly perpendicular to the ground. A magnetic gearing mode may be adopted between the main conveyor 101 and the conveying truck. That is, a magnetic gear that is rotatable around a shaft may be arranged on the main conveyor 101, and accordingly a magnetic rack may be arranged on the conveying truck 105; if the magnetic gear rotates around the shaft when driven by an external force, the conveying truck 105 may be propelled to move along a conveying path by the magnetic force between the magnetic gear and the magnetic rack.

The auxiliary conveyor may be connected with an end of the main conveyor 101. For example, in FIG. 1, two auxiliary conveyors 103 and 104 may be arranged, one of which is connected at one end of the two parallel conveying paths of the main conveyor 101 and the other of which is connected at the other end of the two parallel conveying paths of the main conveyor 101.

When the conveying system 100 operates, the main conveyor 101 may drive the conveying truck 105 thereon to move along the conveying path P1 or P2. After the conveying truck 105 is moved to one end of the main conveyor 101 and enters the auxiliary conveyor 103, the conveying truck, driven by the auxiliary conveyor 103, may be moved from one conveying path to the other conveying path of the main conveyor 101 and further move along the other conveying path. For example, the conveying truck 105 carrying an object may move along the conveying path P1; after the object on the conveying truck 105 is unloaded, the conveying truck 105 that is empty without an object may be fed to the conveying path P2 by the auxiliary conveyor 103 and later re-fed to the conveying path P1 by the auxiliary conveyor 104.

The conveying system 100 as such not only has loop-type moving paths but also can save the ground area.

The conveying system 100 may be applicable to a scenario where the ground area is rather small and the conveying truck 105 needs be reused.

According to one embodiment of the present disclosure, with reference to FIGS. 2 and 3, the auxiliary conveyor 103 may comprise a conveying part 201 and a driving part 202. The auxiliary conveyor 104 has a similar structure to the auxiliary conveyor 103, and details are ignored here.

The conveying part 201 is configured to receive a load from one of at least two conveying paths of the main conveyor 101 and convey the load through the other of the at least two conveying paths. The driving part 202 may be connected with the conveying part 201 and configured to drive the conveying part 201 to move from one of the at least two conveying paths to the other of the at least two conveying paths.

According to one embodiment of the present disclosure, the conveying part 201 may further comprise a first guide rail 203, a magnetic gear 204 and a shaft driving part 205. The first guide rail 203 may be used for guiding a load to move along the conveying path. The magnetic gear 204 may be sleeved on a shaft 206, around which the magnetic gear 204 may rotate to drive the load to move. A first power providing part 205 may be connected with the shaft 206 to provide power for rotation of the shaft 206.

According to one embodiment of the present disclosure, the first power providing part 205 may be an electric motor connected to the shaft 206. As shown in FIG. 2, by means of power provided by the electric motor, the conveying truck 105 may move between the conveying part 201 and the main conveyor 101.

Figure 6:
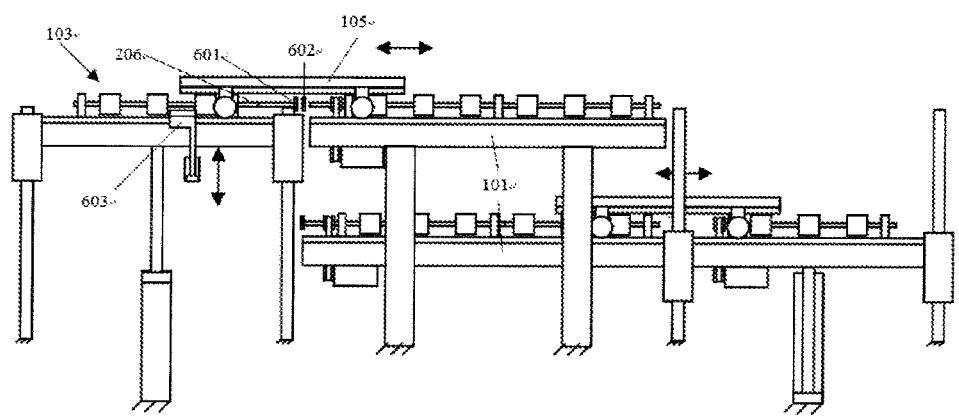
FIG. 6 schematically shows a front view of a shaft driving path in a conveyor according to one embodiment of the present disclosure.

According to another embodiment of the present disclosure, as shown in FIG. 6, the first power providing part 205 may be a magnetic part which is connected with the shaft 206 and configured to deliver torque from the main conveyor 101 to the shaft 206 by magnetic coupling. According to one embodiment of the present disclosure, the magnetic part may comprise a permanent magnet 601 and an electromagnet 602. The permanent magnet 601 may be connected with the shaft 206, and the electromagnet 602 may be connected at the main conveyor 101. When the load needs to move between the main conveyor 101 and the auxiliary conveyor 103, the electromagnet 602 is powered on to produce a magnetic force attracting the permanent magnet 601. In particular, when the conveying truck 105 needs to move between the conveying part 201 and the main conveyor 101, the electromagnet 602 may be powered on so as to bring the electromagnet 602 and the permanent magnet 601 into contact with each other by the magnetic force. In this way, the shaft 206 may rotate together with a shaft on the main conveyor 101 which drives the magnetic gear to rotate, thereby driving the load to move.

When the permanent magnet is located on the conveying part 201, if the permanent magnet is not connected with the electromagnet, then the load on the conveying part 201 might shake. Therefore, according to one embodiment of the present disclosure, as shown in FIG. 6, a locking part 603 may be arranged on the auxiliary conveyor, which locking part 603 may be configured to, when the driving part 202 drives the conveying part 201 to move, lock the load on the horizontal guide rail 203 to prevent the load from shaking.

According to another embodiment of the present disclosure, the permanent magnet may also be located on the main conveyor 101 and the electromagnet may be located on the conveying part 201.

According to one embodiment of the present disclosure, with reference to FIG. 2 in conjunction with FIG. 3, the driving part 202 may further comprise a second guide rail 207 and a second power providing part 208.

The second guide rail 207 may be in sliding connection with the conveying part 201 so as to enable the conveying part 201 to move along a direction guided by it. The second power providing part 208 may be connected with the conveying part 201 and configured to drive the conveying part 201 to move along the second guide rail 207.

According to one embodiment of the present disclosure, the auxiliary conveyor 103 may further comprise a rotating part which is connected with the conveying part 201, the rotating part being configured to drive the conveying part 201 to rotate so as to rotate the load to a position where the load can be easily processed. For example, when the auxiliary conveyor 103 moves the load to a proper position, the orientation of the object may be adjusted by the rotating part. In this way, the need to change the orientation of the object during production and processing can be satisfied.

When the auxiliary conveyor 103 is applied to the conveying system shown in FIG. 1, just as shown in FIG. 2, the driving part 202 may be configured to drive, along a path V1 that is roughly perpendicular to the ground, the conveying part 201 to move from the conveying path P1 to the conveying path P2 or from the conveying path P2 to the conveying path P1.

Figure 5:
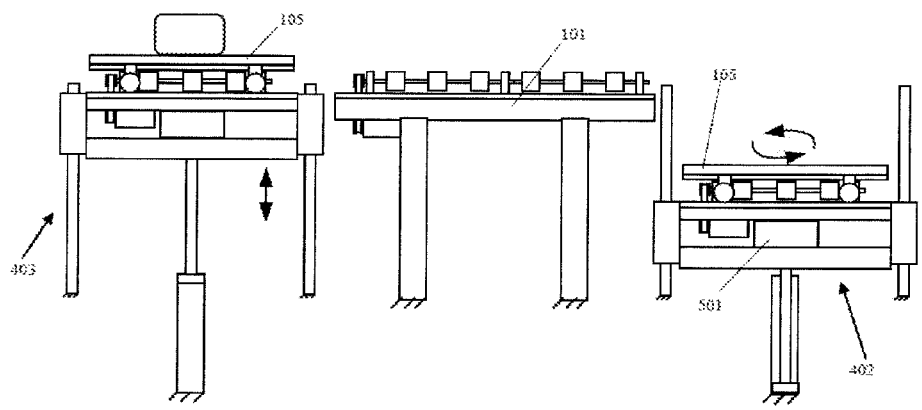
FIG. 5 schematically shows a front view of the conveying system shown in FIG. 4.

With reference to FIG. 4 in conjunction with FIG. 5, according to another embodiment of the present disclosure, in a conveying system 400, the main conveyor 101 may comprise four conveying paths, namely P3, P4, P5 and P6, which may be in the same plane and at least two of which are not parallel. For example, the four conveying paths may form a loop as shown in FIG. 4.

Accordingly, four auxiliary conveyors. i.e., 401, 402, 403 and 404 each having a rotating part 501 may be arranged, the four auxiliary conveyors having similar structures and being respectively connected at ends of the four conveying paths of the main conveyor 101.

In this way, when the conveying truck 105 is located on any auxiliary conveyor, first the height of the conveying truck 105 may be lowered by this auxiliary conveyor so as to cause the conveying truck 105 to be in a space that is large enough for the truck to rotate, then the conveying truck 105 may be rotated to a desired angle by using the rotating part 501, and after completion of rotation, the conveying truck 105 is elevated by the auxiliary conveyor so as to enter the conveying path of the main conveyor 101.

The conveying system 400 can make it convenient for objects to rotate during production and processing.

The embodiments of the present disclosure have been illustrated above, but are not intended to limit the present disclosure. Various variations and changes to the present invention will be apparent to those skilled in the art. Any modification, equivalent replacement, improvement and so on as made under the spirit and principle of the present disclosure should be included in the scope of the claims of the present disclosure.

The invention claimed is:

1. An auxiliary conveyor, connected with a main conveyor which comprises at least two conveying paths, the auxiliary conveyor comprises:
    a conveying part configured to receive a load from one of the at least two conveying paths and convey the load through the other of the at least two conveying paths;
    a driving part connected with the conveying part, the driving part being configured to drive the conveying part to move from one of the at least two conveying paths to the other of the at least two conveying paths;
    a first guide rail configured to guide the load to move along the conveying path;
    a magnetic gear sleeved on a shaft, the magnetic gear rotating around the shaft to drive the load to move;
    a first power providing part connected with the shaft to provide power for rotation of the shaft; and
    a rotating part connected with the conveying part and configured to drive the conveying part to rotate so as to rotate the load to a position where the load can be easily processed.

2. The auxiliary conveyor according to claim 1, wherein the rotating part rotates the conveying part around a vertical axis.

3. The auxiliary conveyor according to claim 1, wherein the first power providing part is an electric motor.

4. The auxiliary conveyor according to claim 1, wherein the first power providing part is a magnetic part configured to deliver torque from the main conveyor to the shaft by magnetic coupling.

5. The auxiliary conveyor according to claim 4, wherein the magnetic part comprises:
    a permanent magnet connected with the shaft; and
    an electromagnet connected at the main conveyor, when the load needs to move between the main conveyor and the auxiliary conveyor, the electromagnet being powered on to produce a magnetic force attracting the permanent magnet so as to drive the shaft to rotate.

6. The auxiliary conveyor according to claim 5, further comprising:
    a locking part configured to lock the load on the first guide rail when the driving part drives the conveying part to move.

7. The auxiliary conveyor according to claim 1, wherein the driving part further comprises:
    a second guide rail in sliding connection with the conveying part to enable the conveying part to move along a direction guided by the second guide rail; and
    a second power providing part connected with the conveying part and configured to drive the conveying part to move along the second guide rail.

8. The auxiliary conveyor according to claim 1, wherein the at least two conveying paths are in the same plane and not parallel to each other.

9. The auxiliary conveyor according to claim 1, wherein the at least two conveying paths are at different heights off the ground.

10. The auxiliary conveyor according to claim 9, wherein the at least two conveying paths are roughly parallel, and a plane formed by the at least two conveying paths is roughly perpendicular to the ground.

11. The auxiliary conveyor according to claim 9, wherein the driving part drives the conveying part to move along a path that is roughly perpendicular to the ground.

12. The auxiliary conveyor according to claim 11, wherein the rotating part rotates the conveying part around a vertical axis.

13. A conveying system, comprising:
a main conveyor, comprising at least two conveying paths;
at least one auxiliary conveyor according to, connected with an end of the main conveyor, the at least one auxiliary conveyor comprising;
a conveying part configured to receive a load from one of the at least two conveying paths and convey the load through the other of the at least two conveying paths;
a driving part connected with the conveying part, the driving part being configured to drive the conveying part to move from one of the at least two conveying paths to the other of the at least two conveying paths;
a load, comprising a conveying truck which is configured to carry a to-be-conveyed object;
a first guide rail configured to guide the load to move along the conveying path;
a magnetic gear sleeved on a shaft, the magnetic gear rotating around the shaft to drive the load to move;
a first power providing part connected with the shaft to provide power for rotation of the shaft; and
a rotating part connected with the conveying part and configured to drive the conveying part to rotate so as to rotate the load to a position where the load can be easily processed.

14. The conveying system according to claim 13, wherein the rotating part rotates the conveying part around a vertical axis.

15. The conveying system according to claim 14, wherein the at least two conveying paths are at different heights off the ground, and the driving part drives the conveying part to move along a path that is roughly perpendicular to the ground.

16. An auxiliary conveyor, connected with a main conveyor which comprises at least two conveying paths, the auxiliary conveyor comprises:
a conveying part configured to receive a load from one of the at least two conveying paths and convey the load through the other of the at least two conveying paths;
a driving part connected with the conveying part, the driving part being configured to drive the conveying part to move from one of the at least two conveying paths to the other of the at least two conveying paths; and
a rotating part connected with the conveying part and configured to drive the conveying part to rotate so as to rotate the load to a position where the load can be easily processed.

17. The auxiliary conveyor according to claim 16, wherein the rotating part rotates the conveying part around a vertical axis.

18. The auxiliary conveyor according to claim 17, wherein the at least two conveying paths are at different heights off the ground, and the driving part drives the conveying part to move along a path that is roughly perpendicular to the ground.

* * * * *